W. H. H. SNELLBAKER.
Brakes for Vehicles.
No. 152,574.            Patented June 30, 1874.
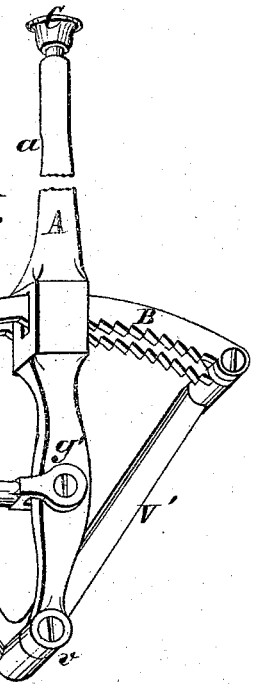
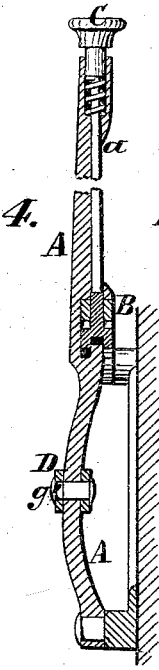
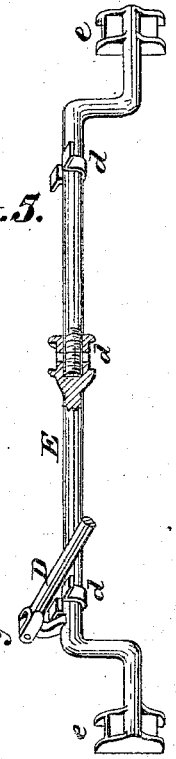
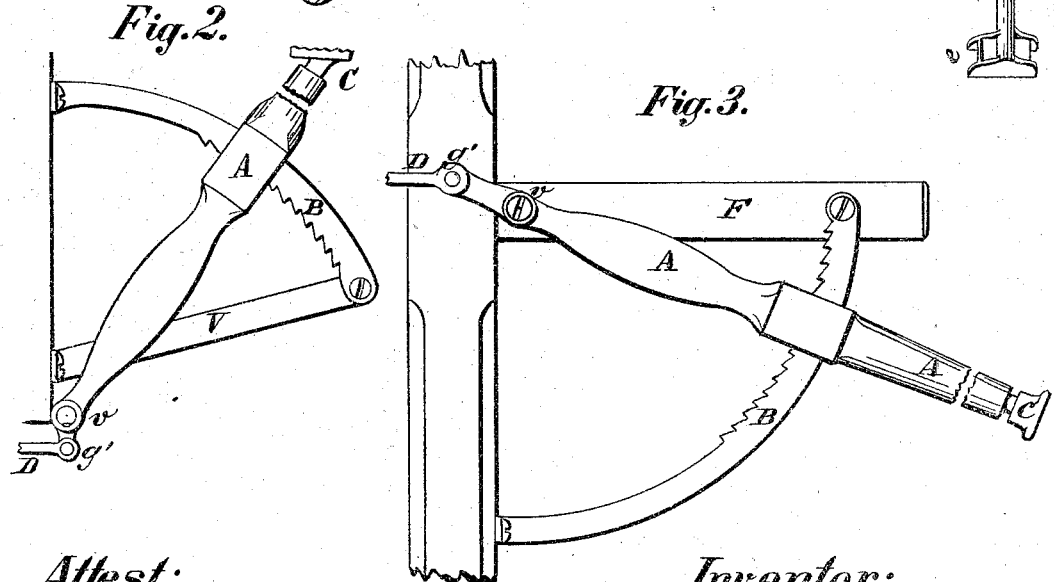
Attest:
                                 Inventor:
                                 William H. H. Snellbaker

UNITED STATES PATENT OFFICE

WILLIAM H. H. SNELLBAKER, OF ST. LOUIS, MISSOURI, ASSIGNOR OF ONE-HALF HIS RIGHT TO W. A. BENNETT, OF NEW YORK CITY.

IMPROVEMENT IN BRAKES FOR VEHICLES.

Specification forming part of Letters Patent No. 152,574, dated June 30, 1874; application filed April 1, 1874.

*To all whom it may concern:*

Be it known that I, WILLIAM H. H. SNELLBAKER, of St. Louis, State of Missouri, have invented an Improved Vehicle-Brake, of which the following is a specification:

The object of my invention is to construct a portable brake, which can be applied to either side or end of all classes of vehicles; and it consists of a brake-lever, (and triangular brace,) whose upper part is hollow, and lower portion, as far as the ratchet, is oval, and grooved on its inner surface to receive the rod which throws the pawl in or out of gear by means of a spring operated by pressing the metallic cap of the lever which actuates the brake-bar by the brake-rod.

Figure 1 is a perspective view of the brake-lever and the brace, as applied to either side of a vehicle. Fig. 2 is a vertical section of the device as applied to the front end of a vehicle, and is operated by the foot. Fig. 3 is a view of the device as attached to the rear end of a vehicle, and dispenses with the use of the brace. Fig. 4 is a vertical view of the internal construction of the brake-lever. Fig. 5 is a view of the brake-bar as ready for attachment to the wagon.

A represents the brake-lever, which is hollow as far as $a$, and has the rest of its inner surface grooved as far as the pawl $b$, which engages with the teeth of the ratchets B by means of a spring concealed in and operated by the metallic cap C. The lower end of the brake-lever A is bolted to the brace V V', which is bolted directly to the wagon-body. D is the brake-rod, which actuates the brake-bar E, which is in two parts, closely fitting at the center of the wagon-body, and united by a key. The brake-bar E is secured to the vehicle by three bearings, $d$, and has brackets, $e$, to hold the wooden shoes.

The operation of my brake will be readily perceived by referring to the annexed drawing, wherein, by pressing upon the cap C, the spring concealed therein throws the pawl out of gear with the teeth of the ratchets, and, upon removing the hand, the pawl will re-engage with the teeth of the ratchets.

When the device is to be applied to the front of the vehicle, it is bolted at the junction of the brake-lever A with the brace V V', and also at V, in such wise that the ratchets will be at right angles to the vehicle, as shown in Fig. 2.

When attached to the rear of a vehicle it is secured to the axle and the coupling-pole F. The brake-bar E is connected with the brake-lever A by the brake-rod D at $g$ $g'$, and is designed for use with or without the brake-lever A. The brake-lever and the brace can be attached to any brake-bar or vehicle in use.

By using both the brake-bar and the lever I have a simple brake, which can be economically and instantly applied to any vehicle.

My improvement in brakes for vehicles consists in the formation and construction of the segment of the circle, upon which the ratchet-teeth are cut, and the braces thereof, in one piece, somewhat in the form of a quadrant, and constructing the lever in such a manner that the said segment shall pass through a slot in said lever, which tends to hold the latter firmly in position when the whole is attached to the vehicle. By this mode of construction great strength is imparted to the operative part of the brake, and the same is less liable to injury, by reason of the strain brought upon such parts when the brakes are applied, and said parts, being so connected, are less liable to loss when detached from the vehicle, and are applied to the latter with greater facility than are the brakes now in use.

What I claim, and desire to secure by Letters Patent, is—

1. The brake-lever A and the brace V V', constructed in the manner and for the purpose shown and described.

2. The brake-bar E, constructed in two parts, the interior ends thereof being connected and held together by means of a sleeve, and secured by a key, in combination with the brake-rod D and lever A, in the manner and for the purpose set forth.

3. The combination of the brake-lever A, the brace V V', and the brake-bar E, constructed in the manner and for the purpose specified.

WILLIAM H. H. SNELLBAKER.

Witnesses:
A. McKENNY,
I. N. STEVENS.